(12) United States Patent
Amblard et al.

(10) Patent No.: US 11,479,725 B2
(45) Date of Patent: Oct. 25, 2022

(54) BIOMASS INJECTION INTO FLUID BED CATALYTIC PYROLYSIS REACTOR

(71) Applicant: Anellotech, Inc., Pearl River, NY (US)

(72) Inventors: Benjamin Thomas Amblard, Lyons (FR); Raghava Dasarathy, New York, NY (US); Frédéric Jean-Michel Feugnet, Lyons (FR); Thierry Albert Pierre Gauthier, Brignais (FR); Eugene Schmelzer, Baltimore, MD (US); Charles Mitchel Sorensen, Jr., Haverstraw, NY (US); Sina Tebianian, Lyons (FR)

(73) Assignee: ANELLOTECH, INC., Pearl River, NY (US)

( * ) Notice: Subject to any disclaimer, the term of this patent is extended or adjusted under 35 U.S.C. 154(b) by 237 days.

(21) Appl. No.: 16/512,981

(22) Filed: Jul. 16, 2019

(65) Prior Publication Data

US 2020/0017770 A1    Jan. 16, 2020

Related U.S. Application Data

(60) Provisional application No. 62/698,347, filed on Jul. 16, 2018.

(51) Int. Cl.
*C10B 49/22* (2006.01)
*B01J 8/00* (2006.01)
(Continued)

(52) U.S. Cl.
CPC ............. *C10B 49/22* (2013.01); *B01J 8/0025* (2013.01); *C10B 53/02* (2013.01); *C10B 53/07* (2013.01);
(Continued)

(58) Field of Classification Search
CPC ......... Y02E 50/10; C10B 53/02; C10B 49/22; C10B 49/10; Y02P 20/145; Y02P 30/20;
(Continued)

(56) References Cited

U.S. PATENT DOCUMENTS 4,029,716 A    6/1977  Kaeding
4,115,929 A    9/1978  Staub et al.
(Continued)

FOREIGN PATENT DOCUMENTS

CN    107597026 A    1/2018

OTHER PUBLICATIONS

International Search Report and Written Opinion issued in the corresponding Application No. PCT/US2019/041974 dated Oct. 18, 2019.
(Continued)

*Primary Examiner* — Imran Akram
(74) *Attorney, Agent, or Firm* — Calderon Safran & Cole P.C.; Peter W. Roberts

(57) ABSTRACT

An improved process is provided for catalytic pyrolysis of biomass, comprising pneumatically injecting a biomass feed via a pneumatic injection line into a fluidized heat medium, for example, hot catalyst, with a carrier gas at a velocity of from 5 to 40 m/s in at least one mixing zone in communication with a pyrolysis reactor in which catalytic pyrolysis occurs, and maintaining a catalyst/biomass mixture flowrate ratio (C/B) of from 4 to 40 downstream from the point of catalyst injection via a catalyst injection line in the at least one mixing zone.

18 Claims, 3 Drawing Sheets

(51) Int. Cl.
- C10B 49/10 (2006.01)
- C10B 53/02 (2006.01)
- C10B 53/07 (2006.01)
- C10B 57/06 (2006.01)
- C10J 3/46 (2006.01)
- C10J 3/60 (2006.01)
- C10J 3/78 (2006.01)

(52) U.S. Cl.
CPC ............... *C10B 57/06* (2013.01); *C10J 3/463* (2013.01); *C10J 3/60* (2013.01); *C10J 3/78* (2013.01); *B01J 2208/00292* (2013.01); *B01J 2208/00938* (2013.01); *C10J 2200/15* (2013.01); *C10J 2300/092* (2013.01); *C10J 2300/0916* (2013.01); *C10J 2300/0946* (2013.01)

(58) Field of Classification Search
CPC ............... C10G 2300/1011; C10G 1/08; B01J 2208/00752; B01J 8/0025; B01J 2208/00769; B01J 2208/00176; B01J 2208/00292; B01J 2208/00548; B01J 2208/00938; B01J 8/1872
See application file for complete search history.

(56) References Cited

U.S. PATENT DOCUMENTS

| | | |
|---|---|---|
| 4,470,931 A | 9/1984 | Callahan et al. |
| 5,175,943 A | 1/1993 | Eastham et al. |
| 5,968,460 A * | 10/1999 | Eastham .............. B01J 8/0005 423/74 |
| 2010/0162625 A1 | 7/2010 | Mills et al. |
| 2011/0094147 A1* | 4/2011 | Bartek .................. C10G 1/08 44/282 |
| 2011/0174597 A1 | 7/2011 | Bartek |
| 2012/0012039 A1* | 1/2012 | Palmas ................ C10B 53/02 110/259 |
| 2012/0090977 A1 | 4/2012 | Bartek et al. |
| 2012/0117860 A1 | 5/2012 | Brady et al. |
| 2012/0214113 A1 | 8/2012 | Kulprathipanja et al. |
| 2012/0271074 A1 | 10/2012 | Boon et al. |
| 2013/0324772 A1 | 12/2013 | Huber et al. |
| 2013/0327629 A1 | 12/2013 | Palmas et al. |
| 2014/0044602 A1 | 2/2014 | Smith |
| 2014/0206913 A1 | 7/2014 | Mazanec et al. |
| 2014/0360919 A1* | 12/2014 | Le Coz ................. B01J 8/18 208/108 |
| 2015/0051428 A1* | 2/2015 | Dayton ................ B01J 38/12 585/242 |
| 2015/0240167 A1 | 8/2015 | Kulprathipanja et al. |
| 2016/0222298 A1* | 8/2016 | Holle .................... C10G 1/06 |
| 2019/0136138 A1* | 5/2019 | Feugnet ............... C10B 53/02 |

OTHER PUBLICATIONS

Bielansky P: "Alternative Feedstocks in Fluid Catalytic Cracking", PHD. Thesis, Vienna University of Technology, Institute of Chemical Engineering, Austria, Mar. 1, 2012 (Mar. 1, 2012), pp. 1-165.

* cited by examiner

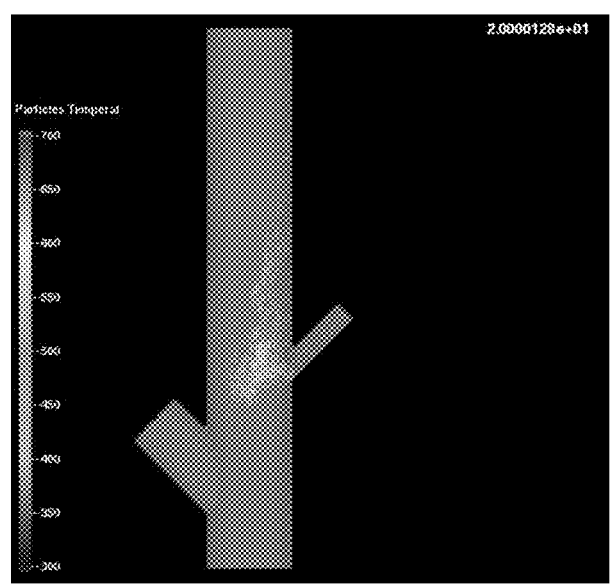
Figure 2 – Biomass Penetration and Temperature (K) near the Injection Point

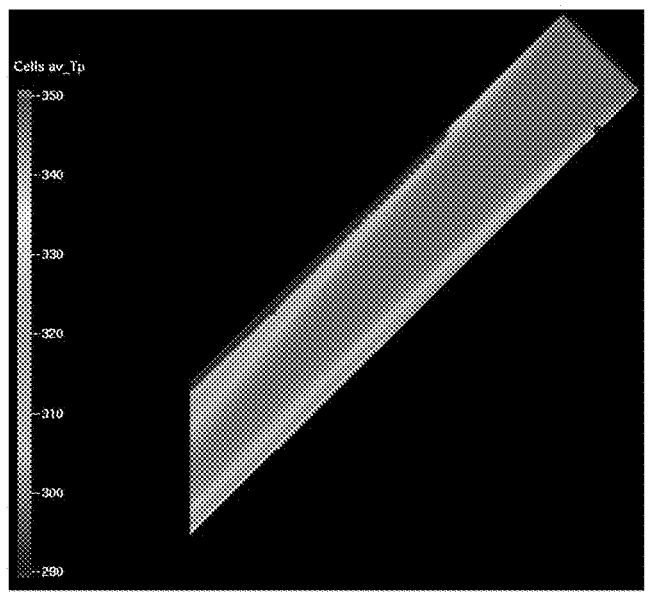
Figure 3 – Average Solids Temperature (K) in the Biomass Injection Line when Wall is Kept at a High Temperature ($D_{inj}$ = 0.4 m, $L_{inj}$ = 2.3 m)

BIOMASS INJECTION INTO FLUID BED CATALYTIC PYROLYSIS REACTOR

CROSS REFERENCE TO RELATED APPLICATIONS

This application claims the benefit of the filing date of U.S. Provisional Application No. 62/698,347 filed Jul. 16, 2018, the entire contents of which are incorporated herein by reference.

FIELD OF THE INVENTION

The present invention relates to a process for the catalytic pyrolysis of biomass and, in particular, to a process for feeding biomass into a catalytic pyrolysis reactor.

BACKGROUND OF THE INVENTION

Biomass handling and feeding into thermochemical reactors for processes such as pyrolysis, gasification and combustion is a crucial design criterion for assuring reliable operation. In biomass catalytic pyrolysis (CP) processes, for example, different operating conditions can cause the blockage of the feeding device resulting in failure to provide uniform and continuous flow of the feed. Therefore, a method for continuous feeding of the biomass feedstock into the reactor that assures its uniform distribution is desirable.

Despite the efforts of researchers and engineers, development of innovative effective feeding systems, flexible in treating biomass materials of different shapes, sizes and densities, remains an area in need of research and development.

Various feed injection layouts used in thermochemical processes treating solid materials such as biomass where the heat for the reaction is provided by a solid heat transfer medium (e.g. catalysts, inert solids) are known. Kulprathinpanja et al (US 2015/0240167A1) describes a green fluid catalytic cracking process where in addition to a hydrocarbon feedstock, a separate auger is used to introduce the biomass particles into the riser and mix them with the hot catalyst. The mixing zone could be achieved directly in the riser or in a chamber with a larger diameter connected to the bottom section of the riser. Boon et al (US 2012/0271074A1) describes a similar process for producing biofuel or biochemicals using any known biomass feeding system with a preference to screw feeders. Mills (US 2010/0162625) describes a biomass fast pyrolysis system utilizing a riser as a reactor and a char combustor for heat recovery. The suggested biomass feeding system is a screw feeder.

In examples where biomass is delivered under pressure, it has been proposed to couple lock hoppers or tapered screws with a screw feeder. Such a biomass feed system was described by Bartek (US 2011/0174597A1) where a combination of lock hopper, vibratory feeder and screw feeder is used to inject the biomass into a reactor at high pressure. Smith (US 2014/0044602) describes a biomass feeding system including gas assist, where the biomass particles flowing from a lock hopper/mechanical conveyor are mixed with pressurized gas to facilitate the transport into the reactor. No detailed description of the downstream mixing zone in terms of the required gas flow or introduction parameters is provided. Further, they allow for direct injection of the biomass into the reactor, as well as pre-mixing with catalyst in the feeding line before injection into the reactor. Bartek et al (US 2012/0090977) describes a reactor for fluidized cracking of solid particulate biomass material. The reactor consists of a riser equipped with two mixing zones. The first mixing zone is for mixing the biomass particles with lift gas and the second mixing zone is for introducing heat medium into the riser. They suggest that injecting the heat medium (e.g. catalyst particles) into an already fluidized biomass would avoid biomass preheating in the injection line. They suggest a lift gas velocity between 1.5 and 11 m/s in the first mixing zone and a biomass injection mainly by mechanical or gravitational devices or by a combination of a fluidized bed feeder and a control valve. For the injection of heat medium into the second mixing zone they suggest that any means known to the person skilled in the FCC art may be used giving a preference to gravity means. Palmas et al (US 2013/0327629A1) describes a char-handling process in a pyrolysis system. One of the configurations described is a riser where first the segregated char particles mix with part of the drained heat medium (solids of the combustor), starting the combustion that is further completed when the solid mixture is transported into a fluidized bed combustor using an oxygen-containing gas stream as the lift gas. Both solids (char and heat transfer medium) are fed into the riser using a standpipe equipped with a valve.

Mazanec et al (US 2014/0206913A1) describe a feed system for introducing biomass into a pyrolysis reactor, such as a catalytic fast pyrolysis fluidized bed reactor, that employs a jet stream of gas or vapor to inject the biomass particles directly into the fluidized bed. The biomass is kept cool, can be metered upstream of a gas jet, and can be injected far into the fluidized bed.

The above-mentioned publications describe biomass feeding into a reactor using conventional mechanical or gravitational devices such as screw feeders, lock hoppers, etc., and even where biomass is injected under pressure there is no indication that such injection is conducted at a velocity much greater than from, e.g., gravity feeding. Such techniques do not provide for optimal mixing, nor do they readily reduce or prevent plugging and bridging in the injection line.

SUMMARY OF THE INVENTION

The present invention provides a process for catalytic pyrolysis of biomass, the process comprising pneumatically injecting a biomass feed via a pneumatic injection line into a fluidized heat medium, such as for example hot catalyst, with a carrier gas at a velocity of from 5 to 40 m/s in at least one mixing zone, such as, for example, 1 to 4 lift pipes, in communication with a pyrolysis reactor, such as a fluidized bed reactor, in which catalytic pyrolysis occurs, and maintaining a catalyst/biomass flowrate ratio (C/B) of from 4 to 40 downstream from the point of catalyst injection via a catalyst injection line in the at least one mixing zone. The biomass injection line in the at least one mixing zone will have a horizontal, upward or downward orientation with a deviation angle of 0 to 60 degrees, such as for example 45 degrees, relative the mixing zone.

An embodiment of the invention comprises pneumatically injecting the biomass feed through two biomass injection lines situated at opposite sides of the at least one mixing zone, with 90° shift with respect to a heat medium inlet, for example, hot catalyst. Another embodiment of the invention is wherein the mixing zone is a lift pipe connected to the bottom of a fluidized bed reactor, the lift pipe having a termination device mounted on top of the lift pipe in order to diminish channeling and enhance a uniform distribution. Another embodiment of the invention is wherein there is one or a plurality of from 2 to 8 points at which additional fluidization gas is injected into the at least one mixing zone, for example upstream of the biomass pneumatic injection line.

BRIEF DESCRIPTION OF THE DRAWINGS

FIG. 2 reports a simulation of the results obtained when one single biomass injection line is used in the process shown in FIG. 1.

FIG. 3 presents a depiction of average solid temperature (K) in the biomass injection line of FIG. 2.

DETAILED DESCRIPTION OF THE INVENTION

Figure 1:
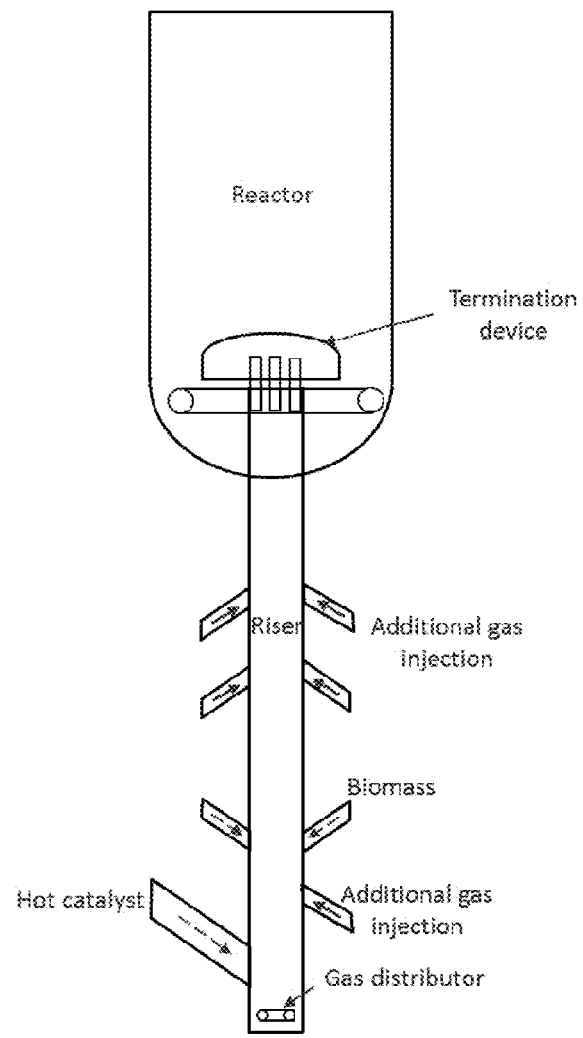
FIG. 1 presents a schematic of a process according to one embodiment of the invention.

In the present invention, the biomass is injected into a mixing zone, e.g. a lift pipe, at a much higher velocity than previously done. In particular, the biomass is not merely combined with a carrier gas, but is pneumatically injected at high velocity into hot catalyst, which is already fluidized. The injection system of this invention addresses the issue of plugging and poor mixing by giving detailed operating parameters and accordingly by employing such pneumatic injection of the biomass into the catalyst flow. For a catalytic pyrolysis process where the reactor is a fluidized bed, this invention addresses the importance of process parameters when mixing the hot catalyst with the biomass in a mixing zone which injects the feed into the bottom of the main reactor in a central position. This configuration results in a faster heating rate given by the higher temperature of the catalyst flowing from a catalyst regenerator compared to the catalyst present in the reactor. Uniform distribution of the reactants is assured by central injection at the bottom of the fluidized bed reactor avoiding temperature heterogeneity resulting from high concentration of the biomass when directly introduced into the fluidized bed reactor through lateral injection. Mixing biomass particles with the heat medium in a mixing zone, e.g. a lift pipe, rather than directly in the fluidized bed reactor, is more efficient and easier to achieve due to the significantly smaller diameter of the mixing zone compared to the reactor. Generally, the diameter of the fluidized bed reactor is at least twice the diameter of the mixing zone.

Thus, the invention provides a commercially simple and reliable biomass feeding system for processes such as catalytic pyrolysis where the heat transfer medium consists of solids. The feeding system comprises a mixing zone, e.g. a lift pipe, with different injection lines connected to its wall (see FIG. 1) that serves as a mixing zone for delivering solids and gas into a fluidized bed reactor. The hot catalyst flows from one or more standpipes connected to or near the bottom of the lift pipe where a gas distributor keeps the solids fluidized. Biomass is injected pneumatically through one or more lines located downstream of the catalyst return line, so as to achieve a specified introduction velocity of the biomass. This introduction velocity is adapted depending on the range of catalyst/biomass mixture flowrate ratio in order to achieve optimal mixing conditions. In addition to a continuous delivery of the biomass, the carrier gas serves to inject the biomass with an adequate velocity in order to penetrate the catalyst flow stream to a depth that is greater than that previously accomplished with prior art techniques. A good penetration of the biomass allows for mixing with the hot medium, e.g. catalyst, which provides the required heat for pyrolysis. The invention enables penetration into the lift pipe at a value of D/3 to D, where D is the diameter of the lift pipe.

Gas generated from the biomass when contacting the heat medium is the primary fluid for lifting the catalyst/biomass mixture and transporting the mixture into the reactor where the catalytic reactions continue subsequent to feed injection. Additional gas lift can be added along the mixing zone, e.g. a lift pipe, through multiple injection points, such as for example from 2 to 8 injection points, or the diameter of the lift pipe can be varied to adjust the superficial gas velocity therein. Part of the product of the reaction can be used as the carrier gas for the biomass injection and additional gas lift along the lift pipe as well. Part of the product can also be used to achieve the fluidization of the catalyst at the bottom of the mixing zone and the main reactor, such as by way of a gas distributor. Biomass penetration and mixing achieved by the present process is a significant improvement over prior continuous operation. The present invention avoids any inadvertent preheating of the biomass before getting into contact with the heat medium, which could result in coke production in the pneumatic injection line causing solid agglomeration and plugging. The system of the invention assures an extremely low solid residence time in the sensitive joining point of the pneumatic injection line, i.e., biomass injector tube, and the hot mixing zone, resulting in negligible preheating of the biomass.

The mixing zone, e.g. lift pipe, of a certain length (depending on pressure balance profile) is connected to the bottom of the fluidized bed reactor. Given the high velocity of the solids and gas coming from the lift pipe, there might be a by-pass in the reactor preventing the feed from being distributed uniformly in the system. High gas velocity can also lead to solid splashing or spouting in the disengaging zone of the reactor that generates operating issues (cyclone overloading, catalyst attrition, material erosion, etc). A termination device is preferably mounted on top of the lift pipe and within the reactor in order to prevent any possible channeling. Effective termination devices for this purpose include, for example, a Mushroom mounted on a Birdcage as described in FR Patent Publication No. 3006607-A1.

As used herein, the term "pyrolysis" has its conventional meaning in the art and refers to the transformation of a compound, e.g., a solid hydrocarbonaceous material, into one or more other substances, e.g., volatile organic compounds, gases and coke, by heat, preferably without the addition of, or in the absence of, molecular oxygen, i.e. $O_2$. Preferably, the volume fraction of oxygen present in a pyrolysis reaction chamber is 0.5% or less. Pyrolysis may take place with or without the use of a catalyst. "Catalytic pyrolysis" refers to pyrolysis performed in the presence of a catalyst, and may involve steps as described in more detail below. Catalytic fast pyrolysis that involves the conversion of biomass in a catalytic fluid bed reactor to produce a mixture of aromatics, olefins, and a variety of other materials is a particularly beneficial pyrolysis process. Examples of catalytic pyrolysis processes are outlined, for example, in Huber, G. W. et al, "Synthesis of Transportation Fuels from Biomass: Chemistry, Catalysts, and Engineering," Chem. Rev. 106, (2006), pp. 4044-4098, incorporated herein by reference.

As used herein, the term "biomass" is given its conventional meaning in the art and is used to refer to any organic source of energy or chemicals that is renewable. Its major components can be: (1) trees (wood) and all other vegetation; (2) agricultural products and wastes (corn, fruit, garbage ensilage, etc.); (3) algae and other marine plants; (4)

metabolic wastes (manure, sewage), and (5) cellulosic urban waste. Examples of biomass materials are described, for example, in Huber, G. W. et al. "Synthesis of Transportation Fuels from Biomass: Chemistry, Catalysts, and Engineering," Chem. Rev. 106, (2006), pp. 4044-4098. The biomass particles may have a mean particle size ranging from 20 μm to 20 mm.

Biomass is conventionally defined as the living or recently dead biological material that can be converted for use as fuel or for industrial production. The criterion as biomass is that the material should be recently participating in the carbon cycle so that the release of carbon in the combustion process results in no net increase averaged over a reasonably short period of time (for this reason, fossil fuels such as peat, lignite and coal are not considered biomass by this definition as they contain carbon that has not participated in the carbon cycle for a long time so that their combustion results in a net increase in atmospheric carbon dioxide). Most commonly, biomass refers to plant matter grown for use as biofuel, but it also includes plant or animal matter used for production of fibers, chemicals or heat. Biomass may also include biodegradable wastes or byproducts that can be burned as fuel or converted to chemicals, including municipal wastes, green waste (the biodegradable waste comprised of garden or park waste, such as grass or flower cuttings and hedge trimmings), byproducts of farming including animal manures, food processing wastes, sewage sludge, and black liquor from wood pulp or algae. Biomass excludes organic material which has been transformed by geological processes into substances such as coal, oil shale or petroleum. Biomass is widely and typically grown from plants, including miscanthus, spurge, sunflower, switchgrass, hemp, corn (maize), poplar, willow, sugarcane, and oil palm (palm oil) with the roots, stems, leaves, seed husks and fruits all being potentially useful. Processing of the raw material for introduction to the processing unit may vary according to the needs of the unit and the form of the biomass. Biomass can be distinguished from fossil-derived carbon by the presence of $^{14}C$ in amounts significantly above that found in fossil fuels.

The catalyst composition particularly advantageous in the fluidized bed reactor into which the at least one mixing zone feeds comprises a crystalline molecular sieve characterized by an SAR greater than 12 and a CI from 1 to 12. Non-limiting examples of these crystalline molecular sieves are those having the structure of ZSM-5, ZSM-11, ZSM-12, ZSM-22, ZSM-23, ZSM-35, ZSM-48, ZSM-50 or combinations thereof. As an example, the catalyst composition comprises a crystalline molecular sieve characterized by an SAR from greater than 12 to 240 and a CI from 5 to 10, such as, for example, molecular sieves having the structure of ZSM-5, ZSM-11, ZSM-22, ZSM-23 or combinations thereof. The method by which CI is determined is described more fully in U.S. Pat. No. 4,029,716, incorporated by reference for details of the method.

For the catalyst composition, the suitable molecular sieve may be employed in combination with a support or binder material such as, for example, a porous inorganic oxide support or a clay binder. Non-limiting examples of such binder materials include alumina, zirconia, silica, magnesia, thoria, titania, boria and combinations thereof, generally in the form of dried inorganic oxide gels and gelatinous precipitates. Suitable clay materials include, by way of example, bentonite, kieselguhr and combinations thereof. The relative proportion of suitable crystalline molecular sieve of the total catalyst composition may vary widely with the molecular sieve content ranging from 30 to 90 percent by weight and more usually in the range of 40 to 70 percent by weight of the composition. The catalyst composition may be in the form of fluidizable microspheres.

The molecular sieve for use herein or the catalyst composition comprising same may be thermally treated at high temperatures. This thermal treatment is generally performed by heating at a temperature of at least 370° C. for a least 1 minute and generally not longer than 20 hours (typically in an oxygen containing atmosphere, preferably air). While subatmospheric pressure can be employed for the thermal treatment, atmospheric pressure is desired for reasons of convenience. The thermal treatment can be performed at a temperature up to about 925° C. The thermally treated product is particularly useful in the present process.

The catalyst particles, such as fluidizable microspheres, comprising the catalyst composition particularly advantageous in the fluidized bed reactor into which the at least one mixing zone feeds may be described using criterion developed by Geldart (Powder Technol. 7, 285-292, 1973, incorporated herein by reference). Particle assemblages are described by their mean diameter and particle density in the Geldart classifications. Geldart classifications "A" and "B" are most useful in the fluidized bed for biomass pyrolysis. Larger, denser particles, such as grains of rice, dry sand and table salt (average size larger than 0.150 mm) are Geldart class "B". Smaller, lighter particles (average size between 0.020 and 0.150 mm) are Geldart class "A".

The heat medium flowing from a catalyst regenerator, and therefore the fluidized heat medium into which the biomass is fed, may be at temperatures in the range of from 550 to 800° C., for example from 600 to 800° C., and the ratio of the catalyst/biomass mixture flowrate (C/B) depends on the operating conditions. The C/B is independent of gas velocity, and refers to biomass before pyrolysis. Typical values for C/B can be in the range of from 4 to 40, such as from 6 to 30, for example from 10 to 20. The biomass may be at ambient temperature or be preheated, but preferably not to temperatures higher than −150° C. to avoid premature pyrolysis in the absence of catalyst contact and to avoid clogging in the pneumatic injection line.

Continuous feeding of the biomass into the pneumatic injection line, i.e. before pneumatic injection into the lift pipe, can be controlled by any traditional feeding device such as hopper and lock hopper, rotary valve, slide valve, screw feeder or their combination. A flow of carrier gas will then, after release from the feeding device, pneumatically transport the biomass solids flowing from the mentioned device and deliver the solids with gas velocity preferably in the range of from 5 to 40 m/s, such as from 8 to 30 m/s, for example from 15 to 25 m/s. The value may be adjusted due to the operating conditions and biomass characteristics in order to avoid saltation and choking conditions, and depends on unit capacity, number of injection lines, and dimensions of the lift pipe, etc. Carrier gas velocity can be adjusted to obtain a proper penetration into the flow of catalyst for different C/B's. Higher C/B's, such as 40 m/s, will necessitate higher carrier gas velocities compared to lower C/B's, such as 5 m/s, in order to obtain same mixing among catalyst and biomass particles. Ranges of C/B's between 4-40 m/s, 6-30 m/s and 10-20 m/s will preferably respectively require carrier gas velocities between 5-40 m/s, 8-30 m/s and 15-25 m/s. The system may operate at different pressures. Solid velocity is related to gas velocity as a fraction thereof, and depends on gas/solid slip factor. Generally, one or more catalyst and biomass injection lines may be used depending on the geometry and feasibility. The more feed injection lines, the better distribution of biomass in the lift pipe.

However, multiple injection lines result also in more control systems for assuring continuous feeding. The biomass and catalyst injection lines are desirably arranged with the highest possible deviation angle. For instance, if one catalyst and two biomass injection lines are used, it is preferable that the biomass injection lines be situated at opposite sides with 90° shift with respect to the catalyst inlet. The biomass injection tube may have horizontal, upward or downward orientation with deviation angles ranging from 0 to 60 degrees (such as 45 degrees) with respect to the horizontal direction. The downward orientation is preferred since it allows for more penetration and ease in delivery to avoid backflow and eddy flow of solids.

While the gas distributor at the bottom of the lift pipe is for keeping the solids in a fluidized state ($U_g > U_{mf}$), it is possible to add further gas (e.g. by lateral injection) upstream of the biomass pneumatic injection line in order to establish a more dilute flow and help the biomass penetration. This gas may be steam or, for example, catalytic pyrolysis recycle gas comprising CO, $CO_2$, light hydrocarbons and combinations thereof. Typical superficial gas velocities in the bottom of the lift pipe below the biomass injection lines range from 0.1 to 2 m/s, such as from 0.3 to 1 m/s.

The vertical distance between the catalyst and biomass injection points in the mixing zone, e.g. lift pipe, should be sufficient to allow for the catalyst flow establishment. This distance depends on the geometry and scale of a given installation, and can be routinely determined. An example is provided below.

Typical superficial gas velocities on top of the lift pipe may range from 5 to 25 m/s, such as from 8 to 20 m/s. Regardless of the superficial velocity at the top of the lift pipe, the avoidance of plugging and poor mixing is controlled by the velocity of the biomass pneumatic injection. Even where the superficial velocity of the catalyst/biomass mixture is the same or similar to existing processes, the beneficial effect of the pneumatic introduction of biomass is retained.

A termination and re-distribution of gas and solids flow device is preferably mounted on the outlet of the lift pipe in order to avoid gas channeling and enhance the feed distribution in the fluidized bed. This device may consist, for example, of a Mushroom mounted on a Birdcage (e.g. FR Patent Publication No. 3006607-A1), or any other termination apparatus commonly used for this purpose. The fluidized bed may be equipped with a gas distributor to keep the solids fluidized and enhance the mixing with the feed coming from the lift pipe.

In an additional embodiment of the invention, the at least one mixing zone may comprise one or more lift pipes, for example 1 to 4, to deliver the gas and biomass solids into a fluidized bed reactor. However, the suggested system consisting of one lift pipe equipped with a termination device is preferable due to ease of control.

Examples

Experiments demonstrating the feed injection system of the present invention were conducted using Computational Fluid Dynamics (CFD) model simulations of the bottom section of a lift pipe to investigate the feasibility in terms of biomass penetration and heating rate. The catalyst flows from a standpipe and the biomass is injected pneumatically into the system where they contact and exchange heat. Table 1 provides the operating conditions utilized for the experiments:

TABLE 1

| | |
|---|---|
| C/B | 20 |
| Gas Velocity $U_g$ lift pipe, m/s | 10 |
| Gas Velocity $U_g$ bottom, m/s | 0.6 |
| Catalyst Average Particle Size $d_p$, µm | 82 |
| Biomass Average Particle Size $d_p$, µm | 621 |
| Number of biomass injection lines | 1 & 2 |
| Carrier gas velocity for biomass injection, m/s | 15 |
| Catalyst temperature, ° C. | 690 |
| Biomass temperature, ° C. | 25 |

Catalytic pyrolysis requires rapid heating of biomass (~400-500° C./s) to temperatures in the range of (400-600° C.). The results of the CFD simulations were analyzed by considering the biomass particles behavior in the system operating under steady state. Simulations were also performed to demonstrate that biomass particles in the pneumatic injection line remain at low temperature to avoid premature pyrolysis in the absence of catalyst which could lead to line clogging. For this purpose, the worst scenario was considered where the wall of the biomass injection line is at the lift pipe bottom temperature of 690° C., under the same flow conditions indicated in Table 1.

Referring more particularly to FIG. 1, a schematic of an embodiment of the present invention is shown. In FIG. 1, a lift pipe feeds into the bottom of a fluidized bed reactor with a termination device atop the lift pipe and in the bottom of the reactor. A gas distributor is deployed at the base of the lift pipe. Hot catalyst particles, such as comprising Geldart class "A" particles comprising zeolite having the structure of ZSM-5, such as from a catalyst regeneration facility, enter the lift pipe above the gas distributor as a fluidized heat medium. Biomass feed with a carrier gas comprising steam, catalytic pyrolysis recycle gas, or a combination thereof, is pneumatically injected into the lift pipe at a velocity of from 5 to 40 m/s and into the hot catalyst particles at a point above the catalyst injection. Additional gas comprising steam, catalytic pyrolysis recycle gas, or a combination thereof, is injected into the lift pipe a various points with the result that the catalyst/biomass flowrate ratio downstream from the point of pneumatic injection of biomass is maintained at from 4 to 40.

Referring more particularly to FIG. 2, which shows some visual results obtained when a single biomass pneumatic injection line is used in the process shown in FIG. 1. The biomass penetrates the cross-section well and mixes properly with the catalyst. Most of the biomass particles are converted to pyrolysis gas and vapor in the lift pipe in close proximity to the biomass injection line entry point. The fraction of biomass particles not immediately converted into gas and vapor was less than 1% in this mixing region, and unreacted biomass pyrolyzed quickly in the section above. The rapid conversion of solid biomass to pyrolysis vapors demonstrates that the proposed feeding system is suitable for catalytic pyrolysis whereby the gases and vapors interact with the catalyst to be converted into valuable chemical and hydrocarbon fuel products.

Referring more particularly to FIG. 3, a depiction is provided of average solid temperature (K) in the biomass injection line when its wall is kept at a high temperature. The extremely fast motion of the biomass particles resulted in a negligible heating (less than 10° C./m) of the particles. This result confirms the importance of pneumatic conveying of the present invention for avoiding solid agglomeration. As shown in FIG. 3, the average solid temperature achieved in the injection line remains largely around 300° K.

Without further elaboration, it is believed that one skilled in the art can, using the preceding description, utilize the present invention to its fullest extent. The preceding preferred specific embodiments are, therefore, to be construed as merely illustrative, and not limiting of the remainder of the disclosure in any way whatsoever.

In the foregoing and in the examples, all temperatures are set forth uncorrected in degrees Celsius and, all parts and percentages are by weight, unless otherwise indicated.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. A process for catalytic pyrolysis of biomass in a fluidized bed reactor, the process comprising:
   a. pneumatically injecting a biomass feed with a carrier gas at a velocity of from 5 to 40 m/s via a pneumatic injection line into fluidized catalyst in at least one mixing zone within at least one lift pipe extending from, and in fluid communication with, the fluidized bed reactor, wherein the at least one mixing zone is outside the fluidized bed reactor, and wherein the biomass feed in the pneumatic injection line has a temperature of no more than 150° C.,
   b. wherein each lift pipe is fitted with a distributor at its bottom end, with a mushroom type termination device mounted on top, and with a catalyst injection line being connected to the lift pipe below the pneumatic injection line, and
   c. injecting catalyst through the catalyst injection line into the at least one mixing zone and maintaining a catalyst/biomass mixture flowrate ratio (C/B) of from 4 to 40 downstream from the point of biomass injection into the at least one mixing zone.

2. The process of claim 1 wherein the biomass feed is injected through the pneumatic injection line in the at least one mixing zone having a horizontal, upward or downward orientation with a deviation angle of 0 to 60 degrees.

3. The process of claim 2 wherein the deviation angle is 45 degrees.

4. The process of claim 1 wherein there are two pneumatic injection lines situated at opposite sides of the at least one mixing zone, with 90° shift with respect to a heat medium inlet.

5. The process of claim 1 wherein a feeding of the biomass feed into the pneumatic injection line before pneumatic injection into the at least one mixing zone is controlled by a hopper, lock hopper, slide valve, rotary valve, screw feeder or a combination thereof.

6. The process of claim 1 wherein gas generated from the catalytic pyrolysis of the biomass feed in the fluidized bed reactor provides additional carrier gas for transporting the catalyst/biomass mixture into the fluidized bed reactor.

7. A process of claim 1 wherein the catalyst injected into the at least one mixing zone through the catalyst injection line has a temperature of from 600 to 800° C.

8. The process of claim 1 wherein additional gas is injected into the at least one mixing zone upstream of the pneumatic injection line.

9. The process of claim 8 wherein the additional gas is injected into the at least one mixing zone at a plurality of points along the at least one mixing zone to adjust a superficial gas velocity in the at least one mixing zone.

10. The process of claim 8 wherein the additional gas comprises steam, catalytic pyrolysis recycle gas, or a combination thereof.

11. The process of claim 1 having a superficial gas velocity at a bottom of the at least one mixing zone below the pneumatic injection line of from 0.1 to 2 m/s.

12. The process of claim 1 having a superficial gas velocity at a top of the at least one mixing zone of from 5 to 25 m/s.

13. The process of claim 1 wherein the biomass feed comprises solid carbonaceous material, wood, agricultural waste or residue, forestry by-product, municipal waste or a combination thereof.

14. The process of claim 1 wherein a catalyst of the catalytic pyrolysis comprises Geldart class A particles, class B particles, or mixtures thereof.

15. The process of claim 14 wherein the catalyst comprises a crystalline molecular sieve characterized by an SAR greater than 12 and a CI from 1 to 12.

16. The process of claim 15 wherein the crystalline molecular sieve has the structure of ZSM-5, ZSM-11, ZSM-12, ZSM-22, ZSM-23, ZSM-35, ZSM-48, ZSM-50 or combinations thereof.

17. The process of claim 1 wherein the flow rate of the biomass feed in the pneumatic injection line is continuous.

18. The process of claim 1 wherein the diameter of the fluidized bed reactor is at least 2 times the diameter of the at least one mixing zone.

* * * * *